(12) United States Patent
Sato (10) Patent No.: US 6,643,767 B1
(45) Date of Patent: Nov. 4, 2003

(54) INSTRUCTION SCHEDULING SYSTEM OF A PROCESSOR

(75) Inventor: Toshinori Sato, Fukuoka (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/492,274

(22) Filed: Jan. 27, 2000

(30) Foreign Application Priority Data

Jan. 27, 2000 (JP) ........................................ 2000-018291

(51) Int. Cl.[7] .............................................. G06F 15/00
(52) U.S. Cl. ........................................ 712/219; 712/218
(58) Field of Search ................................ 712/205, 216, 712/217, 218, 219, 244

(56) References Cited

U.S. PATENT DOCUMENTS

| | | | | |
|---|---|---|---|---|
| 5,012,403 A | * | 4/1991 | Keller et al. ................ | 712/228 |
| 5,421,021 A | * | 5/1995 | Saini .......................... | 712/211 |
| 5,519,841 A | * | 5/1996 | Sager et al. ................ | 711/202 |
| 5,784,603 A | * | 7/1998 | Leung et al. ............... | 712/23 |
| 5,944,818 A | * | 8/1999 | Baxter et al. .............. | 712/244 |
| 5,966,544 A | * | 10/1999 | Sager ......................... | 712/32 |
| 6,098,166 A | * | 8/2000 | Leibholz et al. ........... | 712/215 |
| 6,163,838 A | * | 12/2000 | Merchant et al. .......... | 712/218 |
| 6,205,542 B1 | * | 3/2001 | Grochowski et al. ....... | 712/219 |
| 6,212,626 B1 | * | 4/2001 | Merchant et al. ........... | 712/218 |
| 6,240,509 B1 | * | 5/2001 | Akkary ....................... | 712/228 |

OTHER PUBLICATIONS

Akkary, H. and Driscoll, M.A. in "A Dynamic Multi Threading Processor," published in Microarchitecture, 1998. Micro–31. Proceedings. 31st Annual ACM/IEEE International Symposium on, 1998, pp.: 226–236.*

Hennessy and Patterson, Computer Architecture A Quantitative Approach, 2nd Edition, 1996, pp. 105–107.*

Sato, T. in "Data dependence speculation using data address prediction and its enhancement with instruction reissue," published in Euromicro Conference, 1998. Proceedings, 24th, vol. 1, 1998, pp.: 285–292 vol. 1.*

\* cited by examiner

Primary Examiner—Eddie Chan
Assistant Examiner—David J. Huisman
(74) Attorney, Agent, or Firm—Oblon, Spivak, McClelland, Maier & Neustadt, P.C.

(57) ABSTRACT

The present invention is related to a processor capable of speculatively executing an instruction having a data dependence upon a preceding instruction in order to improve the efficiency of dynamically scheduling instructions. The reissue of instructions is possible without lowering the efficiency of the instruction scheduling process by dividing the function of scheduling instructions and the function of the reissue of instructions.

6 Claims, 8 Drawing Sheets

INSTRUCTION SCHEDULING SYSTEM OF A PROCESSOR

This patent application claims for benefit of the filing date of Japanese Patent Application No. 2000-18291 filed on Jan. 27, 2000, the entire contents of which are hereby incorporated by reference.

BACKGROUND OF THE INVENTION

1. Field of the Invention

The present invention is related to a processor and in particular to the instruction scheduling of a processor.

2. Description of the Related Art

One of the factors preventing designers of processors from improving performance is the interdependencies between instructions. Dependences disturbing processor performance include the control dependence, the name dependence, the data dependence. There are many studies relating to the control dependence to attempt to remove the dependency by the branch prediction technique and the speculative execution. The name dependence is caused by hardware resource shortage, i.e., the shortage of available registers. This dependence can be eliminated using register renaming (R. M. Keller, Look-Ahead Processors, ACM Computing Surveys, vol.7, no.4, pp.177–195, 1975). On the other hand, however, the data dependence can not be removed by such techniques, as it is called true dependence. Hence, the data dependence is a serious obstacle to improvement of the instruction level parallelism.

Figure 1:
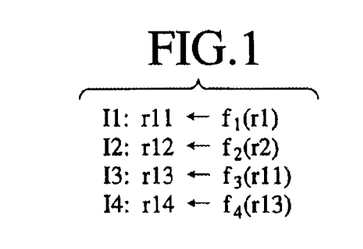
FIG. 1 is a schematic diagram showing an example of an instruction sequence.

An example will be explained with the instruction sequence as illustrated in FIG. 1. In order to make it easy to understand the discussion, each operation of f1 to f4 has a single source operand. It is assumed that the execution latency is 1 except for the instruction I1. The instruction I1 is assumed to be a load instruction, which is executed to occur cache miss, resulting in an execution latency of 4. The instruction sequence as illustrated in FIG. 1 involves two data dependences. One data dependence occurs between the instruction I1 and the instruction I3 while the other occurs between the instruction I3 and the instruction I4. In the case that there is a data dependence, the subsequent instruction can not be executed before completion of the execution of the previous instruction. In this case, the instruction I3 can not be executed unless the execution of the instruction I1 is completed while the instruction I4 can not be executed unless the execution of the instruction I3 is completed. Accordingly, in the conventional technique, a subsequent instruction having no data dependence are executed in advance of a preceding instruction which is stalled because of a data dependence. This treatment is called the dynamic instruction scheduling which is implemented, for example, by means of reservation station (R. M. Tomasulo, An Effect Algorithm for Exploiting Multiple Arithmetic Units, IBM Journal, vol.11, pp.25–33, 1967).

Figure 2:
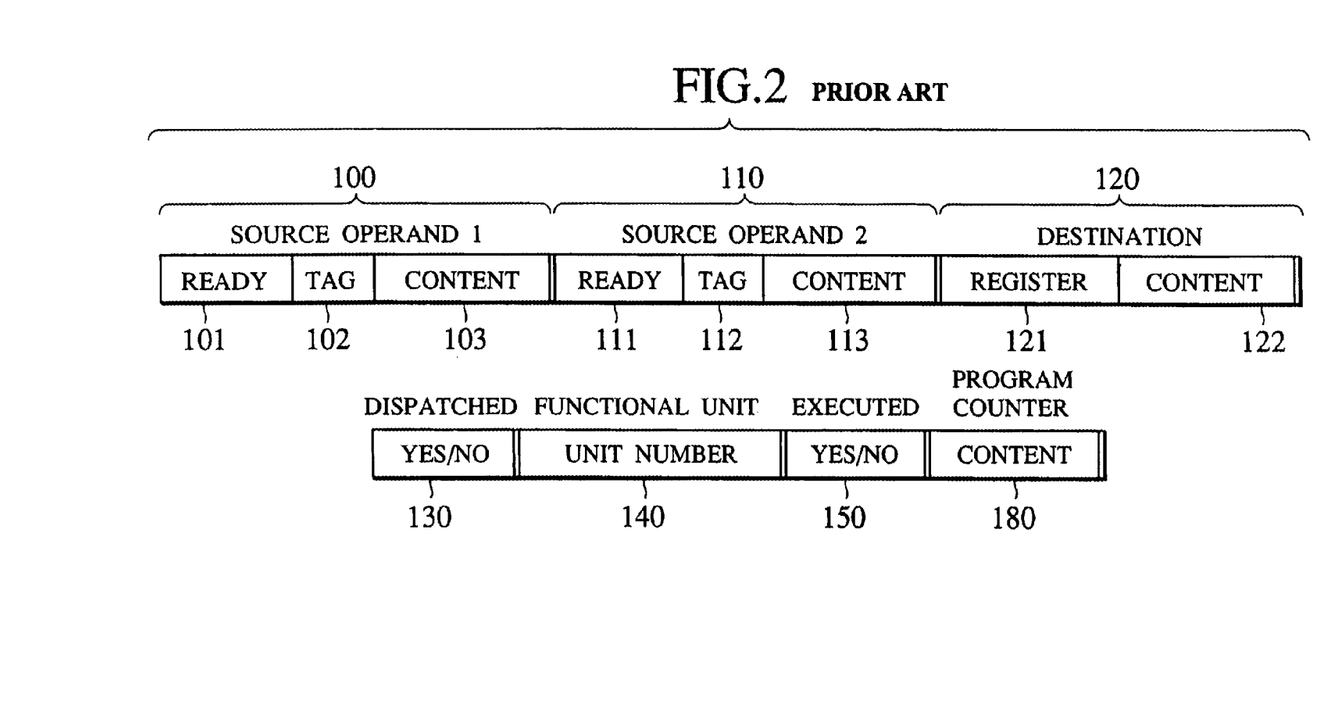
FIG. 2 is a schematic diagram showing an entry of the prior art instruction window.

FIG. 2 shows one entry in an instruction window designed with a register uptake unit (G. S. Sohi, Instruction Issue Logic for High-Performance, Interruptible, Multiple Functional Unit, Pipelined Computers, IEEE Trans. on Computer, vol.39, no.3, pp.349–359, 1990). Each entry of the instruction window is composed of two source operand fields 100 and 110, a destination field 120, a dispatch field 130, a functional unit field 140, an execution bit 150 and a program counter field 180. If the source operand is not yet available, a read bit 101(11) of the source operand fields is reset in order to indicate that the source operand is not available. The tag designating the source operand is also set. When the source operand becomes available, the value of the source operand is transferred to the content field 103(113) of the source operand field followed by setting the ready bit 101(111). On the other hand, a destination register number is stored in the register field 121 of the destination field 120 and the result of execution of the instruction is stored in the content field 122. The dispatched bit 130 is provided in order to indicate whether or not the instruction has been dispatched to the functional unit as designated by the functional unit field 140. The executed bit 150 is set when the execution of the instruction is completed. If the executed bit 150 is set, it is possible to dispatch a succeeding instruction(s) having the data dependence upon this instruction. Finally, the program counter field 180 is used to recover the status of the processor after the prediction fails and to implement precise exception.

The registration of instructions into the register update unit is performed in the sequential order of the instructions as in the target program. When the execution of a preceding instruction is completed, the result of the execution 122 and the destination register number 121 are broadcasted. The destination register number 121 is monitored for a succeeding instruction in order to obtain the result of the execution as the source operand 103(113) if the source operand tag 102(112) matches with the destination register number 121. It is possible to execute the succeeding instruction when all the source operands are obtained. In this case, the succeeding instruction can be executed even if execution(s) between the preceding instruction and the succeeding instruction is(are) not yet completed.

Figure 3:
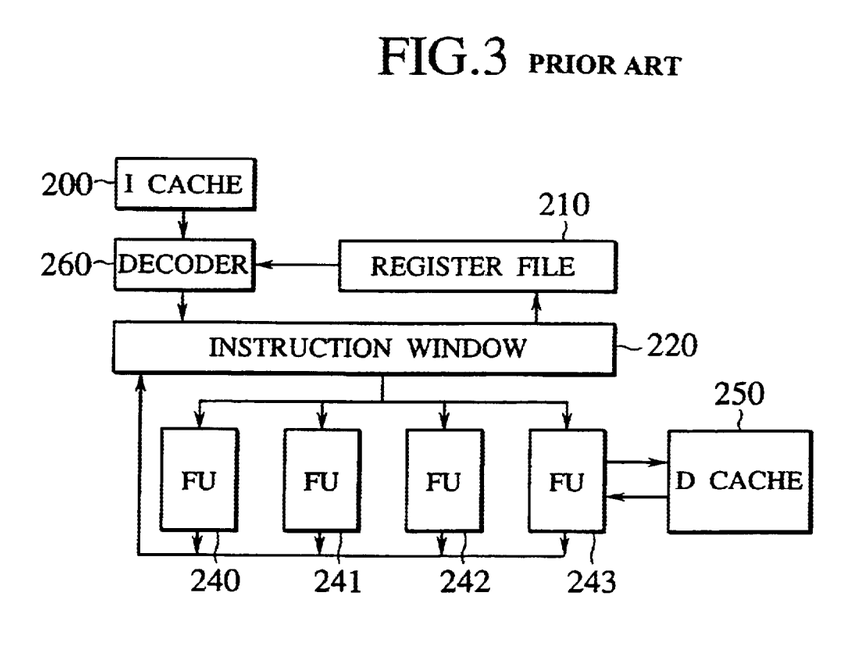
FIG. 3 is a block diagram showing the prior art processor.

FIG. 3 is a block diagram showing the prior art processor. As illustrated in the same figure, the prior art processor is composed of an instruction cache 200, an instruction decoder 260, a register file 210, an instruction window 220, functional units 240 to 243 and a data cache 250. The processor serves to decode an instruction as fetched from the instruction cache 200 by means of the instruction decoder 260 and to register the instruction to the instruction window 220. The source operand is read from the register file 210. In the case that the source operand can not be obtained from the register file 210, it is transferred from the functional units 240 to 243 after completion of the execution of the preceding instruction. The instruction of which the source operand (s) as required becomes available is dispatched to the functional units 240 to 243. The result of the execution is written into the register file 210 through the instruction window 220.

Figure 4:
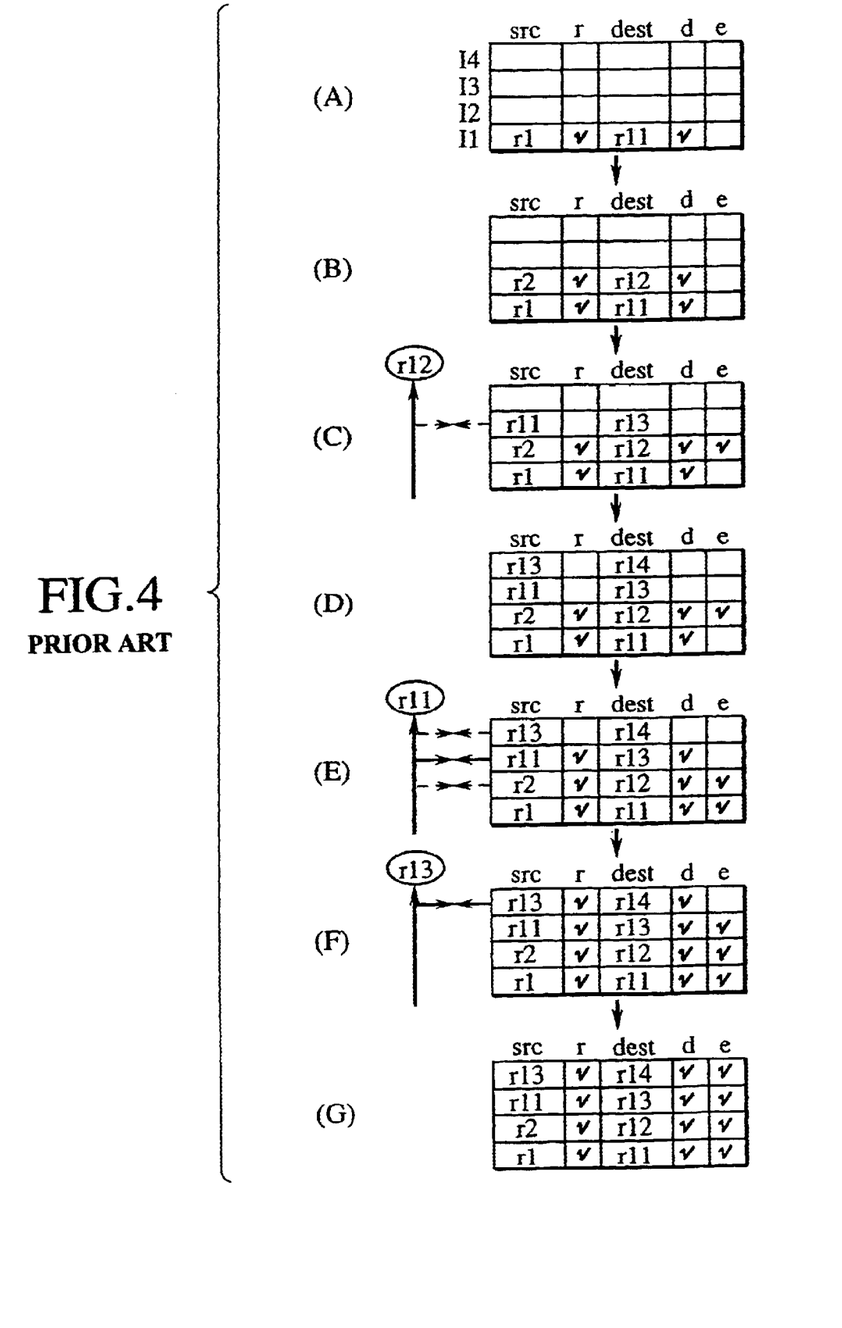
FIG. 4 is a schematic diagram showing an example of the process of scheduling instructions in the case that the instruction sequence as illustrated in FIG. 1 is executed by the use of the prior art instruction window.

FIG. 4 is a schematic diagram showing an example of the instruction scheduling in the case that the instruction sequence as illustrated in FIG. 1 is executed. In order to make it easy to understand the discussion, the following condition is assumed. Both the total number of instructions as fetched and the total number of instructions as dispatched are 1. Description about committing instructions is dispensed with. It is assumed that the destination register number with the tag information is equal to the architecture register number of the processor. Also, it is assumed that the register r1 and the register r2 have been available. The instruction scheduling will be explained on the above assumption. In the first cycle as illustrated in FIG. 4(A), the instruction I1 is issued. The source operand tag r1 and the destination register tag r11 are then saved in the corresponding fields. The source operand in the register r1 is available so that the ready bit (r) is set. Furthermore, the instruction I1 is dispatched so that the dispatched bit (d) is set. In the next cycle as illustrated in FIG. 4(B), the instruction I2 is fetched and dispatched. In the next cycle as illustrated in FIG. 4(C), the instruction I3 is issued. Since the executed bit of the instruction I1 which generates the source operand r11 is not yet set, it is impossible to dispatch the instruction I3. In the same cycle as illustrated in FIG. 4(C), the instruction I2 is executed in order to write back the result of the execution into the register r12 followed by setting the executed bit (e). Since the destination register tag r12 of the instruction I2 does not match the source operand tag r11 of the instruction I3, the instruction I3 is not dispatched at this time. The arrows as illustrated in FIG. 4(C) with dotted lines is used to indicate that the source operand tag of the instruction I3 does not match the destination register tag of the instruction I2. In the next cycle as illustrated in FIG. 4(D), the instruction I4 is issued. Since r13 is not yet available, it is not dispatched. In the next cycle as illustrated in FIG. 4(E), the operation of the instruction I1 is completed followed by writing the result of the execution back to r11 and setting the executed bit. Since the source operand r11 of the instruction I3 is available, the instruction I3 is dispatched. The arrows as illustrated in FIG. 4(E) with bold lines is used to indicate that the source operand tag of the instruction I3 match the destination register tag of the instruction I1. In the next cycle as illustrated in FIG. 4(F), since the operation of the instruction I3 is completed and the source operand r13 becomes available, the instruction I4 is dispatched. Finally, in the cycle as illustrated in FIG. 4(G), the execution of the instruction I4 is completed to finish the execution of the instruction sequence.

In order to resolve the problem of the data dependences, it is proposed to speculatively resolve the data dependences by the prediction of the results of execution in F. Gabbay: Speculative execution based on value prediction, Technical Report #1080, Department of Electrical Engineering, Technician, 1996. The speculative execution of instructions having data dependences requires recovery of the previous state of the processor before the speculative execution if the speculation fails. For this purpose, the instruction window is introduced as explained in the following.

The instruction window is designed to save the predicted data which has been used for the speculative execution. When the previous instruction generating the operand relating to the speculative execution of the instruction is completed, the result of the execution of the previous instruction and the predicted data are compared with each other. If the result of the execution of the previous instruction and the predicted data match each other, the speculative execution succeeds. If they do not match each other, the previous state of the processor before the speculative execution has to be restored. Also, the instructions having the dependency upon the load instruction of an incorrect predicted value should be executed again with a correct operand.

However, there occurs the following problem in the prior art reissue structure. All the instructions have to be saved in the instruction window before being committed so that the effective capacity of the instruction window is lowered resulting in lowering the flexibility of the instruction scheduling. In order to maintain the performance of the processor, the capacity of the instruction window may be increased. However, the machine cycle of the processor is closely related to the capacity and therefore the capacity cannot simply be increased. In order to increase the capacity of the instruction window, it is required to design the instruction window in a pipelined fashion and increase the latency thereof for the purpose of maintaining the machine cycle of the processor. The increase in the latency results in the performance penalty. In other words, the time lag between the issuance of an instruction and the output of the result of the execution of the instruction tends to be extended.

SUMMARY OF THE INVENTION

It is an object of the present invention to improve the efficiency of dynamically scheduling instructions in a processor capable of speculatively executing instructions having data dependences. In the case of prior art processors, when the speculation fails, the instruction of which speculative execution fails and the instruction(s) having the data dependency thereon are detected and issued again for the purpose of restoring the previous state of the processor before the speculative execution as failed. However, this prior art technique tends to result in lower efficiency of the instruction scheduling process. In accordance with the present invention, the reissue of instruction is possible without lowering the efficiency of the instruction scheduling process by dividing the function of scheduling instructions and the function of the reissue of instructions.

DETAILED DESCRIPTION OF EMBODIMENTS

In order to solve the problem as described above, an instruction window is divided into the function of scheduling instructions and the function of the reissue of instructions. The instruction scheduling as divided is called herein as a "decoupled instruction window".

[Embodiment 1]

Figure 5:
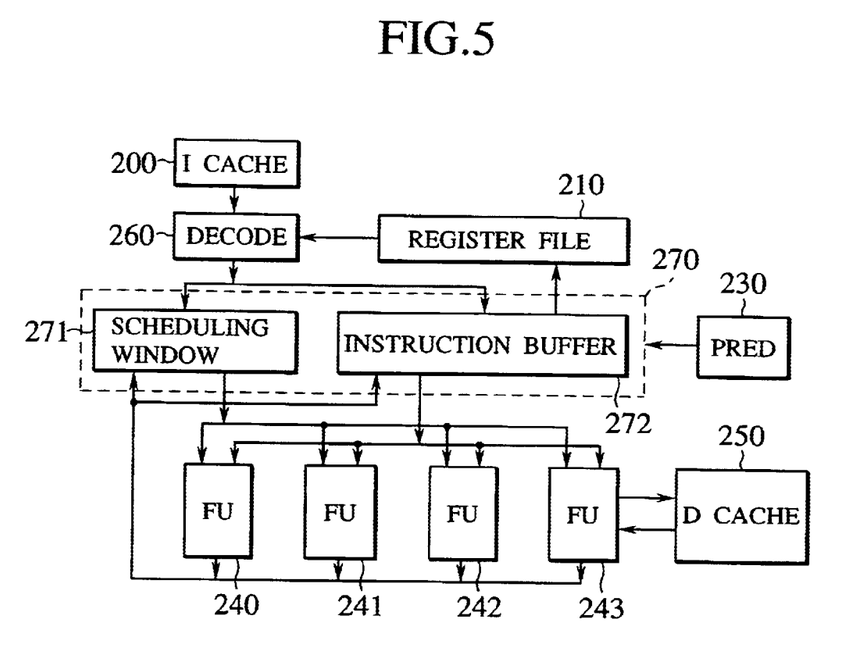
FIG. 5 is a block diagram showing a processor provided with the decoupled instruction window in accordance with a first embodiment of the present invention.

FIG. 5 is a block diagram showing the decoupled instruction window of a processor in accordance with a first embodiment of the present invention. As illustrated in the same figure, the processor in accordance with the first embodiment is composed of an instruction cache 200, an instruction decoder 260, a register file 210, a decoupled instruction window 270, a data prediction unit 230, functional units 240 to 243 and a data cache 250. The decoupled instruction window 270 is composed in turn of a small instruction scheduling window 271 provided for scheduling instructions and a large instruction reissue window 272 provided for reissuing instructions. In the following, the instruction scheduling window 271 is simply called the scheduling window 271 while the instruction reissue window 272 is simply called the instruction buffer 272.

Figure 6:
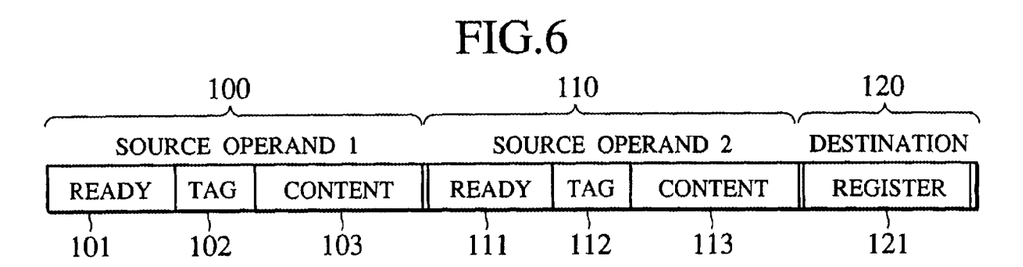
FIG. 6 is a schematic diagram showing one entry of the scheduling window (the reservation station) as illustrated in FIG. 5.

The scheduling window 271 is composed of a reservation station as explained above. FIG. 6 is a schematic diagram showing one entry of the reservation station. Each entry is composed of two source operand fields 100(110) and the destination field 120. However, unlike RUU(register update unit), the destination field 120 is composed simply of a register field 121 indicative of a tag.

Figure 7:
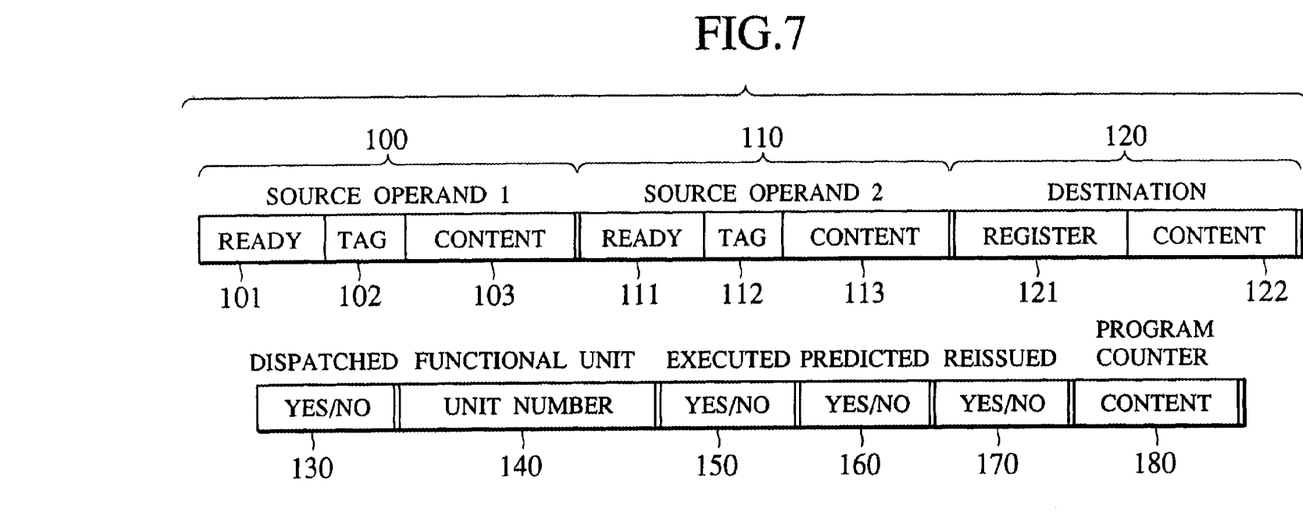
FIG. 7 is a schematic diagram showing an entry of the instruction buffer capable of reissuing instructions as illustrated in FIG. 5.

The instruction buffer 272 is in turn composed of an RUU capable of reissuing instructions as explained with reference to FIG. 7. FIG. 7 is a schematic diagram showing the instruction buffer capable of reissuing instructions by functionally extending the RUU. Each entry is provided with the prediction bit (Predicted) 160 and a reissued bit (reissued) 170. The prediction bit 160 is indicative of whether or not the content 122 of the destination field 120 is in agreement with the value as predicted. If either the executed bit 150 or the prediction bit 160 is set, the succeeding instructions having the data dependence upon this preceding instruction can be dispatched. The value as predicted is saved in the destination content field 122.

The result of the actual execution as obtained and the value as predicted are compared with each other in order to evaluate the speculative execution. The correct value is then stored in the destination content field 122 of the destination field 120 followed by resetting the prediction bit 160.

The reissued bit 170 is indicative of reissuing the instruction after judgement of the speculative execution as failed.

When the execution of the instruction is completed to obtain the result, the destination register tag and the result of execution is broadcasted in the same manner as the prior art instruction scheduling. At the same time, the signal indicative of whether the prediction succeeded or failed is broadcasted. Hereinbelow, such a signal is called as a reissue signal.

In the case that the prediction was successful, it is possible to dispatch the succeeding instruction(s) having the source operand tag 101(111) in agreement with the destination register tag 121 of the instruction of which the speculative execution succeeded.

On the other hand, when the speculation fails, the succeeding instructions become candidates of the reissue if the source operand tag 101(111) of the succeeding instruction is in agreement with the destination register tag 121 of the instruction of which speculative execution fails. In the case that the dispatched bit 130 is set in the succeeding instruction having the source operand tag thereof being in agreement with the destination register tag of the instruction of which speculative execution fails, the succeeding instruction has to be reissued since it has been executed with an incorrect source operand. The dispatched bit 130 and the executed bit 160 are then reset while the reissued bit 170 is set. In the case that the execution of the instruction as reissued is completed, the reissue signal is broadcasted. Accordingly, the reissue signal is indicative of completion of the execution of the instruction as reissued or completion of the execution of the instruction of which speculative execution fails. Thereafter, a succeeding instruction(s) is subsequently reissued if the source operand tag 101(111) thereof is in agreement with the destination register tag 121 of the instruction as reissued and the dispatched bit 130 thereof is set, in the same manner as explained above. Namely, instructions to be reissued include a succeeding instruction having the data dependence upon the preceding instruction of which speculative execution fails, and a further instruction having the data dependence upon the succeeding instruction having the data dependence upon the preceding instruction. The instructions to be reissued are sequentially detected in this manner. This mechanism can be implemented only with one additional reissue signal as compared with the prior art instruction window so that it is avoided to increase the hardware amount and the machine cycle time.

Figure 8:
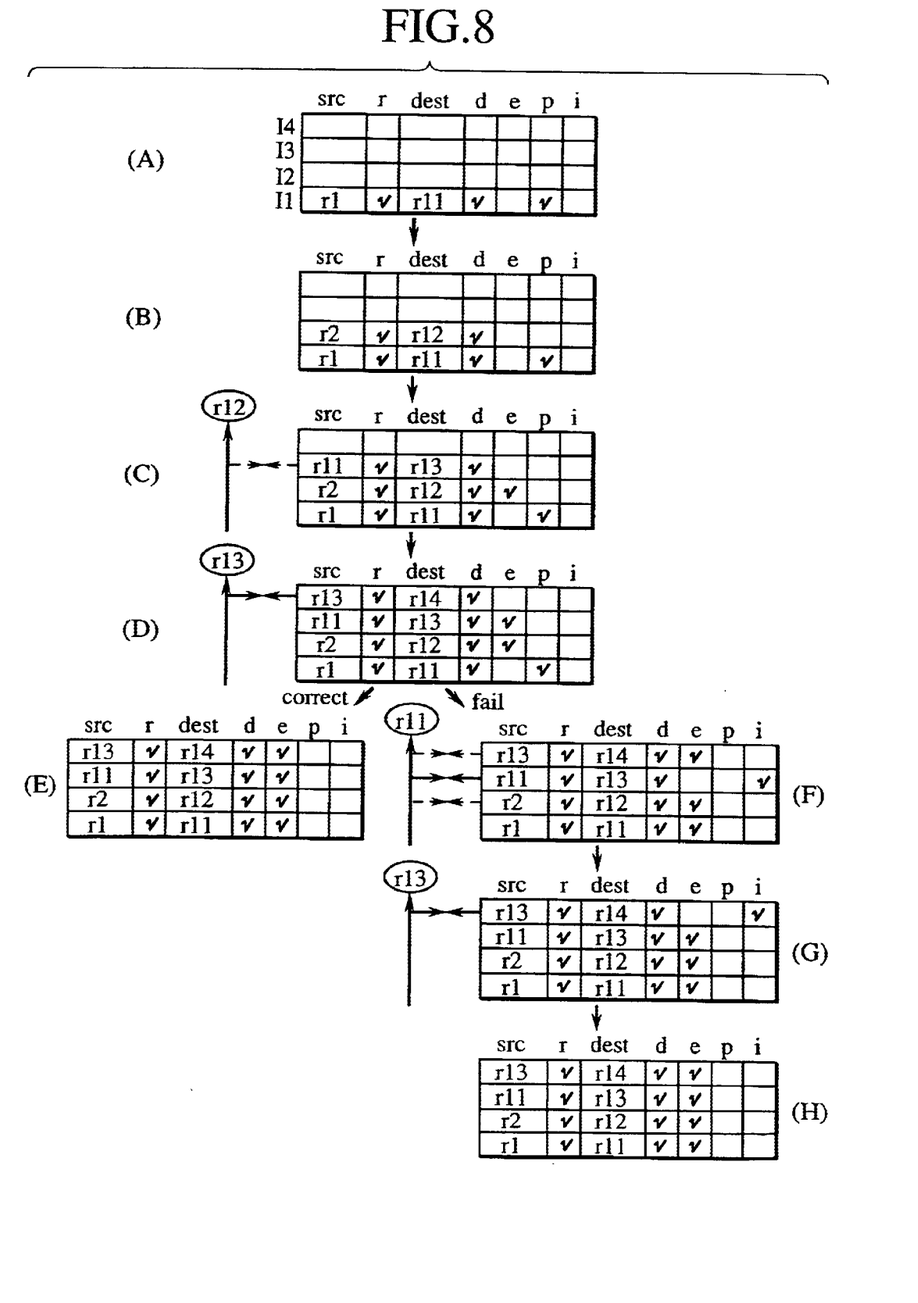
FIG. 8 is a schematic diagram showing an example of the process of scheduling instructions in the case that the instruction sequence as illustrated in FIG. 1 is executed by the use of the decoupled instruction window as illustrated in FIG. 5.

FIG. 8 is a schematic diagram showing an example of a RUU as functionally extended. It is assumed that only the instruction I1 can be speculative executed with a predicted value.

In the first cycle as illustrated in FIG. 8(A), the instruction I1 is issued. The source operand tag r1 and the destination register tag r11 are then saved in the corresponding fields. The source operand in the register r1 is available so that the ready bit (r) is set. Furthermore, the instruction I1 is dispatched so that the dispatched bit (d) is set. The source operand r11 is predicted for the instruction I1 followed by setting the prediction bit (p).

In the next cycle as illustrated in FIG. 8(B), the instruction I2 is fetched and dispatched.

In the next cycle as illustrated in FIG. 8(C), the instruction I3 is issued. Since the predicted bit (p) of the instruction I1 which generates the source operand r11 of the instruction I3 is set, it is possible to dispatch the instruction I3. In the same cycle as illustrated in FIG. 8(C), the instruction I2 is executed in order to write back the result of the execution into the register r12 followed by setting the executed bit (e). Since the destination register tag r12 of the instruction I2 does not match the source operand tag r11 of the instruction I3, the result of the execution of the instruction I2 is not used by the instruction I3.

In the next cycle as illustrated in FIG. 8(D), the instruction I4 is issued. Since the operation of the instruction I3 is completed and the source operand r13 becomes available, the instruction I4 is dispatched.

There are two cases in the next cycle. One case is that the prediction was successful while the other is that the prediction failed for the instruction I1.

In the case that the prediction was successful as illustrated in FIG. 8(E), the prediction bit of the instruction I1 is reset while the executed bit of the instruction I1 is set. The operation of the instruction I4 is completed in the same cycle followed by setting the executed bit. The sequence is then completed.

On the other hand, when the prediction failed for the instruction I1 as illustrated in FIG. 8(F), the reissue of the instruction(s) is initiated. The reissue signal is then broadcasted. The reissued bit (i) of the instruction I3 is set to reissue the instruction I3, since the instruction I3 is dispatched with an the incorrect source operand having the destination register tag matching the source operand tag of the instruction I1 of which speculative execution fails. The instruction I3 is issued and the dispatched bit thereof is set.

The execution of the instruction I3 is completed in the next cycle as illustrated in FIG. 8(G) so that the execution bit is set while the reissued bit is reset. The reissue signal is broadcasted at the same time. The instruction I4 is detected as an instruction to be reissued in the same manner in the previous cycle.

The execution of the instruction I3 is completed in the next cycle as illustrated FIG. 8(H) to complete the instruction sequence with the 7 cycles.

Accordingly, in the case that the prediction of a source operand failed, the number of the required cycles is equal to the number of the cycles required in the case that the source operand is not predicted. Namely, there is no penalty even when the speculation fails.

As explained above, the reissue of instructions is possible with a smaller amount of hardware (the unit for comparing the predicted value and the actual value and the unit for generating the reissue signal) and without affecting the machine cycle.

As illustrated in FIG. 5, in accordance with the first embodiment of the present invention, after an instruction is fetched from the instruction cache 200 and decoded by means of the instruction decoder 260, the instruction is issued to the scheduling window 271 and the instruction buffer 272. When the instruction is dispatched to the functional units 240 to 243, the corresponding entry is immediately dismissed from the scheduling window 271. However, the corresponding entry in the instruction buffer 272 is continuously maintained. When the instruction is committed, the corresponding entry in the instruction buffer 272 is dismissed. If either the scheduling window 271 or the instruction buffer 272 becomes full, the issuance of instructions is halted.

The scheduling window 271 is responsible for scheduling instructions. In other words, most of instructions are dispatched from the scheduling window 271 to the functional units 240 to 243. After dispatched, the corresponding entry of an instruction having dispatched is dismissed from the scheduling window 271 so that it is avoided to lower the effective capacity of the instruction window as in the prior art instruction window. Furthermore, because of the small capacity of the scheduling window 271, the machine cycle is no longer affected by the mechanism of scheduling instructions. However, in the case that the speculative execution failed, the reissue of an instruction can not be performed by the scheduling window 271. The instruction buffer 272 is provided for the purpose of backing up instructions.

The instruction buffer 272 is responsible for the reissue of instructions. All the instructions are maintained in the instruction buffer 272 until being committed. In the case that the speculative execution failed, an instruction to be reissued is obtained and dispatched from the instruction buffer 272. In order to effectively perform the speculative execution, the instruction buffer 272 has to be designed with a large capacity. The instruction buffer having such a large capacity affects the machine cycle of the processor so that the instruction buffer 272 is pipelined. However, the instruction buffer 272 is required only in the case that the speculative execution failed so that it does not seriously affect the processor performance that the instruction buffer 272 is designed in a pipelined fashion.

It is not difficult to select one of the two instruction sources, i.e., the scheduling window 271 and the instruction buffer 272, for obtaining the same instruction. In the case that the speculative execution failed, the instruction to be reissued is obtained from only the instruction buffer 272. Accordingly, the instruction source to be selected is determined. On the other hand, an instruction having the data dependency and not yet having been dispatched can be supplied from either of the scheduling window 271 and the instruction buffer 272. However, since the instruction buffer 272 is pipelined, the instruction instance is transferred from the instruction buffer 272 with a longer delay compared with the instruction instance being transferred from the scheduling window 271. Accordingly, the instruction instance obtained from the scheduling window 271 is dispatched to the functional unit while the instruction instance obtained from the instruction buffer 272 is prevented from being dispatched.

As explained above, the decoupled instruction window 270 makes it possible to resolve the problem, which may possibly arise when the mechanism of reissuing instructions is implemented, without affecting the processor performance.

Next, the decoupled instruction window in accordance with the first embodiment of the present invention will be evaluated by means of a simulator. The simulator is designed to simulate a 8-way superscalar processor with out-of-order execution. The dynamic instruction scheduling is performed on the basis of an RUU. The number of entries in the RUU is 128. Two variations of the RUU will be evaluated. One of them is a typical RUU which is operating with a latency of one cycle. The other is an RUU which is pipelined and operating with a latency of two cycles. Each functional unit is capable of executing all the instruction within one cycle, except for the multiplication operation and the division operation which are executed respectively with the latency of four cycles and with the latency of twelve cycles. Data is supplied from a non-blocking two way set associative L1 data cache of 128 K bytes in the form of 32-byte lines. The L1 data cache is accessed one cycle after generation of the data address. The latency in the case of a cache miss is 6 cycles. The L1 data cache is backed up by a direct mapped L2 cache of 8 M bytes in the form of 64-byte lines. The latency of the L2 data cache in the case of a cache miss is 18 cycles for the first word and two cycles for each subsequent word. All the memory reference instructions can not be executed unless the execution of a preceding store instruction has been completed. Instructions are supplied from a two way set associative L1 instruction cache of 128 K bytes in the form of 32-byte lines. The L2 cache is shared by the L1 instruction cache and the L1 data cache.

The branch prediction technique is implemented with a target address buffer of a four way set associative memory, a two-level adaptive branch prediction circuit of the gshare type and a return address stack having eight entries. The branch prediction circuit is updated when an instruction is committed.

The prediction of data value is performed by means of the load data value prediction circuit by the use of the instruction prediction stride as proposed by Gabbay, et al. The load data value prediction circuit consists of 4K entries directly mapped thereon.

The decoupled instruction window in accordance with the first embodiment of the present invention is composed of a concentrated reservation station having 64 entries and an RUU having 128 entries and serving to reissue instructions. The RUU is designed in a pipelined fashion with a latency of two cycles.

The SPECint95 benchmark programs are used for the test of the processor's performance. A test file distributed by Standard Performance Evaluation Corporation is used. The benchmark programs and the input files are as follows.

| program | input file |
| --- | --- |
| 099.go | null.in |
| 124.m88ksim | ctl.in |
| 126.gcc | cccp.i |
| 129.compress | test.in |
| 130.li | test.lsp |
| 132.ijpeg | specmun.ppm |
| 134.perl | primes.in |
| 147.vortex | vortex.in |

Each program is compiled by gcc of GNU, version 2.6.3 with the optimization option –03. The simulation is continued until each program exits or 10 M instructions have been executed. Only instructions as committed are counted.

Figure 9:
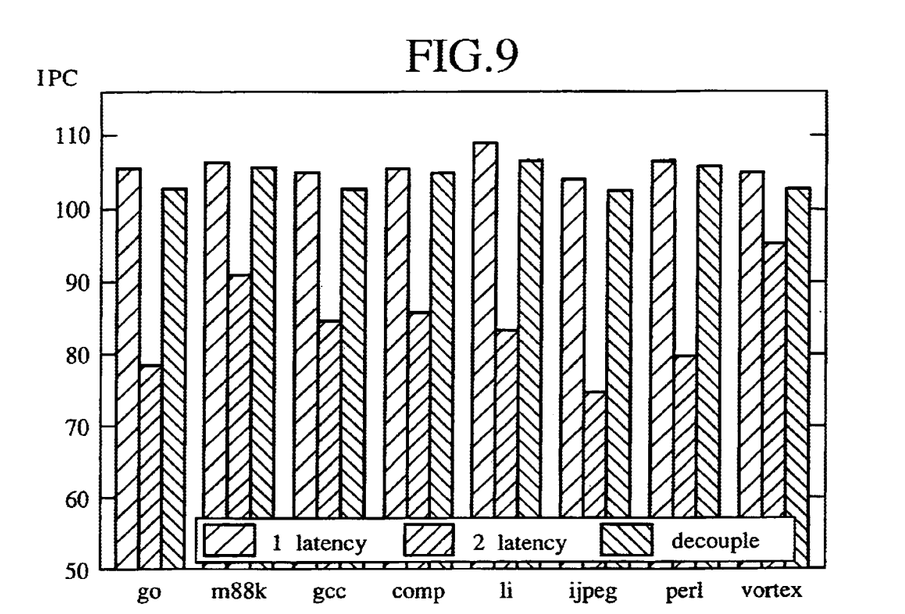
FIG. 9 is a graphic diagram showing the improvement of the performance of the processor in the case that the decoupled instruction window as illustrated in FIG. 5.

FIG. 9 is a graphic diagram showing the improvement of the performance of the processor in the case that the decoupled instruction window of the first embodiment of the present invention is employed. Among from the three bars for each category, the left is indicative of the improvement of the performance in the case of the model with an RUU having a latency of one cycle; the middle is indicative of the improvement of the performance in the case of the model with a piplined RUU having a latency of two cycles; and the right is indicative of the improvement of the performance in the case of the model with the decoupled instruction window. The improvement of the performance is represented by IPC (committed instructions per cycle), i.e., the number of instructions having been committed per cycle. Since the machine cycle has to be slower in the case of the RUU having a latency of one cycle, the RUU having a latency of two cycles is implemented for the purpose of avoiding the shortcomings. However, in the case making use of the RUU having a latency of two cycles, IPC is significantly lowered as illustrated. If the lowering is compensated only by improving the processing speed of the processor, the improvement of at least 25% is required in the case of 132.ijpeg. This is difficult in practice. Accordingly, the performance is eventually lowered in the case making use of the RUU having a latency of two cycles as compared with the case making use of the RUU having a latency of one cycle. On the other hand, IPC obtained in the case that the decoupled instruction window of the first embodiment of the present invention is nearly equal to that obtained in the case making use of the RUU having a latency of one cycle. More exactly reviewing, while the performance of the processor is slightly lower than that obtained with the RUU having a latency of one cycle, the processor implemented with the decoupled instruction window of the first embodiment of the present invention can be designed faster than that implemented with the RUU having a latency of one cycle. Namely, improvement of at least 5% in the operation speed is possible so that the total performance is superior than the processor with the RUU having a latency of one cycle. Accordingly, the decoupled instruction window of the first embodiment of the present invention has an advantage over the RUU having a latency of one cycle.

[Embodiment 2]

Figure 10:
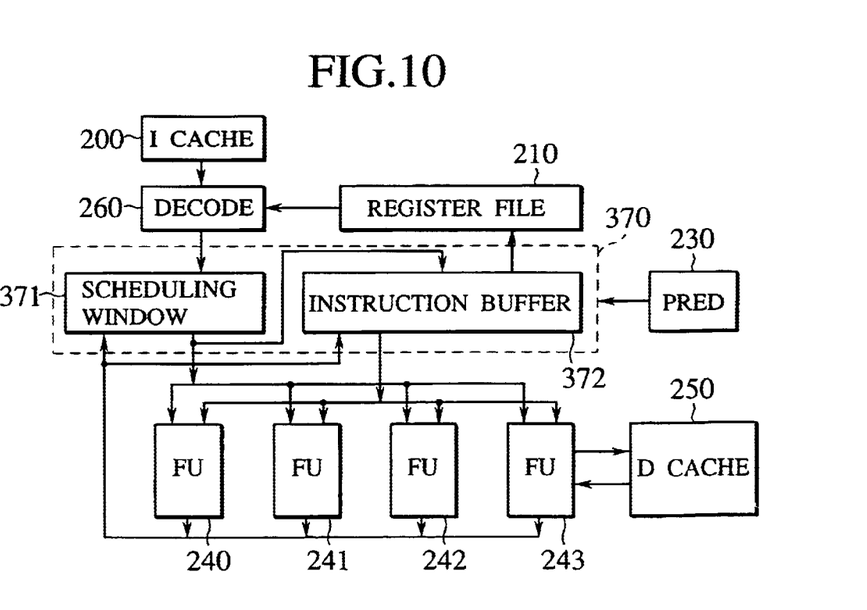
FIG. 10 is a block diagram showing a processor provided with the decoupled instruction window in accordance with a second embodiment of the present invention.

FIG. 10 is a block diagram showing a processor provided with the decoupled instruction window in accordance with a second embodiment of the present invention. As illustrated in the same figure, the processor in accordance with the second embodiment is composed of an instruction cache 200, an instruction decoder 260, a register file 210, a decoupled instruction window 370, a data prediction unit 230, functional units 240 to 243 and a data cache 250. The decoupled instruction window 370 is composed in turn of a small instruction scheduling window 371 provided for scheduling instructions and a large instruction reissue window 372 provided for reissuing instructions. In the following, the instruction scheduling window 371 is simply called the scheduling window 371 while the instruction reissue window 372 is simply called the instruction buffer 372.

Figure 11:
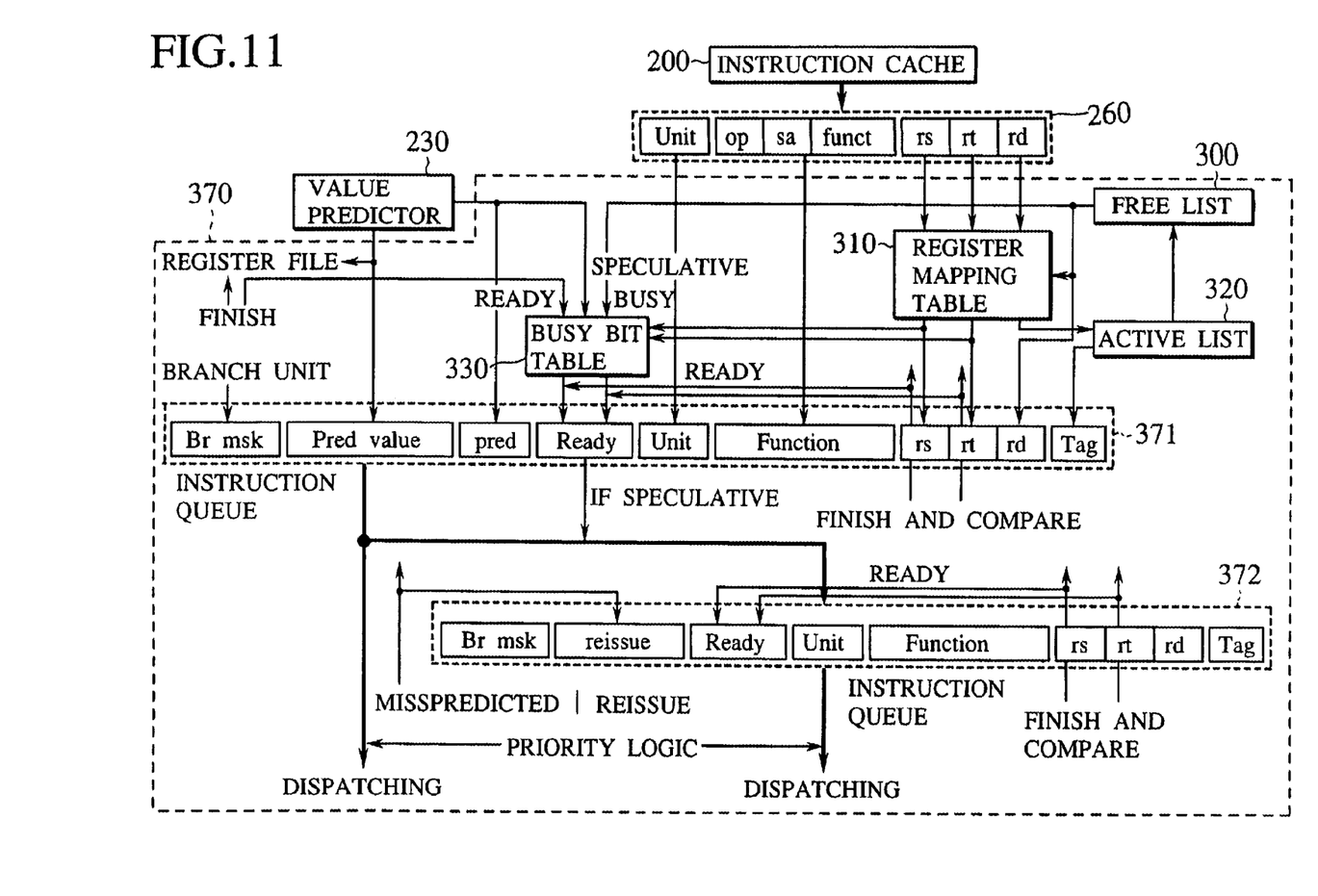
FIG. 11 is a block diagram showing the structure of the decoupled instruction window as illustrated in FIG. 10.

FIG. 11 is a block diagram showing the details of the decoupled instruction window 370 in accordance with the second embodiment of the present invention. In FIG. 11, a free list 300, a register mapping table 310, an active list 320 and a busy bit table 330 are illustrated which are omitted from FIG. 10.

In the first embodiment of the present invention as illustrated in FIG. 5, the scheduling window 271 and the instruction buffer 272 are connected in parallel so that the instruction as decoded by the decoder 260 is transferred to both the scheduling window 271 and the instruction buffer 272 from the decoder 260.

On the other hand, the second embodiment of the present invention as illustrated in FIG. 10, the scheduling window 371 and the instruction buffer 372 are connected in series so that the instruction as decoded by the decoder 260 is transferred only to the scheduling window 271 from the decoder 260 but not to the instruction buffer 272 from the decoder 260. The instruction buffer 372 receives instructions from the scheduling window 371.

The decoupled instruction window 270 of the first embodiment of the present invention as illustrated in FIG. 5 is also provided with the free list 300, the register mapping table 310, the active list 320 and the busy bit table 330 in addition to the scheduling window 271 and the instruction buffer 272. However, the scheduling window 271 and the instruction buffer 272 are connected in parallel in this case.

The free list 300, the register mapping table 310 and the active list 320 of the first and second embodiments of the present invention are used to implement a register renaming mechanism. When an instruction is decoded, the destination register number thereof is register renamed. The register number after renaming is given from the free list 300. The correspondence between each register number after renaming (physical register number) and the corresponding original register number (logical register number) is registered in the register mapping table 310. In this case, if there are two physical register numbers corresponding to the same logical register number, the older physical register number is removed to the active list 320. The physical register number as removed to the active list 320 is dismissed from the active list 320 and pooled in the free list 300 when committing the instruction having the operand corresponding to the physical register number.

The data value as predicted by the load data value prediction circuit 230 is saved in the corresponding field of the scheduling window 371 and, written onto the register file 210. At the same time, the pred bit of the scheduling window 371 is set. The information of this pred bit is given to the busy bit table 330.

The busy bit table 330 is indicative of whether or not the respective register of the register file is available. There are three states, "ready", "speculative" and "busy". In the case of "busy", the value of the register is not available. While the value of the register is available in the case of either "ready" or "speculative", the value of the register under "speculative" might be incorrect. Accordingly, the instruction dispatched with the speculative register value has to be maintained in the instruction buffer 372.

The remaining fields of the scheduling window 371 contain the following information. The "br ask" field contains information about a branch instruction. The "unit" field contains information designating a functional unit to which the instruction is dispatched. The "function" field contains information designating the type of the operation of the instruction to be executed. The "rs/rt/td" fields contain information designating the destination register number and the source register number respectively. Finally, the "tag" field contains a tag designating an entry in the active list 320.

After an instruction is fetched from the instruction cache 200 and decoded by means of the instruction decoder 260, the instruction is issued to the scheduling window 371. When the instruction is dispatched to the functional units 240 to 243, the corresponding entry is immediately dismissed from the scheduling window 371. If the dispatched instruction is subjected to speculative execution, it is stored in the instruction buffer 372. The instruction instance is maintained in the instruction buffer 372 before being committed and dismissed from the instruction buffer 372 after being committed. If either the scheduling window 371 or the instruction buffer 372 becomes full, the issuance of instructions is halted.

The scheduling window 371 is responsible for scheduling instructions. Namely, in most cases, instructions are dispatched from the scheduling window 371 to the functional units 240 to 243. After being dispatched, the corresponding entry of an instruction having been dispatched is dismissed from the scheduling window 371 so that it is avoided to lower the effective capacity of the instruction window as in the prior art instruction window as explained above. Furthermore, because of the small capacity of the scheduling window 271, the machine cycle is no longer affected by the mechanism of scheduling instructions. However, in the case that the speculative execution failed, the reissue of an instruction cannot be performed by the scheduling window 371. The instruction buffer 372 is provided for the purpose of backing up instructions.

The instruction buffer 372 is responsible for the reissue of instructions. Only the instructions subjected to speculative execution are maintained in the instruction buffer 372 until being committed. In the case that the speculative execution failed, an instruction to be reissued is obtained and dispatched from the instruction buffer 372. The instruction buffer 372 might be similar in capacity to the scheduling window 371 since only the instructions subjected to speculative execution are maintained. Accordingly, unlike the first embodiment of the present invention, the instruction buffer 372 may not necessarily be designed in a pipelined fashion.

Also, in the case of the decoupled instruction window in accordance with the second embodiment of the present invention, unlike the first embodiment, each instruction is supplied from only one of the scheduling window 371 and the instruction buffer 372. Accordingly, depending upon the state of the functional units, one of the scheduling window 371 and the instruction buffer 372 is selected to dispatch an instruction. In this case, the instruction reissued from the instruction buffer 372 may be given a higher priority level.

As explained above, the decoupled instruction window 370 makes it possible to resolve the problem, which may possibly arise when the mechanism of reissuing instructions is implemented, without affecting the processor performance.

The "sa" field of the decoder 260 stands for "shift amount."

"FINISH": After an instruction is finished (executed) the execution bit of the instruction in the busy bit table 330 is set. As shown in FIG. 8(C), the instruction I2 is executed and the execution bit of the instruction I2 in the busy bit table 330 is set. As shown in FIG. 8(D), the instruction I3 is executed and the execution bit of the instruction I3 in the busy bit table 330 is set.

"IF SPECULATIVE": If speculative execution, the instructions are sent to the instruction reissue window 372. If not speculative execution, the instructions are dispatched.

"FINISH AND COMPARE": After an instruction is executed the register tag of the executed instruction is compared to the source operand tags of the following instructions. As shown in FIG. 8(C), the instruction I2 is executed and the destination register tag r12 of the instruction I2 is compared to the source operand tag r11 of the instruction I3. As shown in FIG. 8(D), the instruction I3 is executed and the destination register tag r13 of the instruction I3 is compared to the source operand tag r13 of the instruction I4.

"READY": After an instruction is executed or predicted the register tag of the executed or predicted instruction is compared to the source operand tags of the following instructions. If the register tag of the executed or predicted instruction match the source operand tag of the following instruction, the ready bit of the following instruction is set. As shown in FIG. 8(D), the instruction I3 is executed and the destination register tag of the instruction I3 is compared to the source operand tag of the instruction I4. The register tag r13 of the executed instruction I3 matches the source operand tag r13 of the instruction I4 and the ready bit of the instruction I4 is set. The destination register tag of predicted instruction I1 is compared to the source register tag of instruction I3 (not shown in FIG. 8(C)). Because the destination register tag r11 of predicted instruction I1 matches the source register tag r11 of the instruction I3, the ready bit of the instruction I3 is set.

"PRIORITY LOGIC": The "PRIORITY LOGIC" selects the instruction from the scheduling window 371 or the instruction from the instruction buffer 372 as the instruction to be dispatched depending on the priority level.

The arrow output from DECODER 260 inputs to REGISTER MAPPING TABLE 310 indicates that the number of the logical register is entered into REGISTER MAPPING TABLE 310.

The arrow output from REGISTER MAPPING TABLE 310 inputs to SCHEDULING WINDOW 371 indicates the number of the physical register, which is mapped to the logical register in REGISTER MAPPING TABLE 310, is entered into SCHEDULING WINDOW 371.

The arrow output from REGISTER MAPPING TABLE 310 input to BUSY BIT TABLE 330 indicates that the number of the physical register is also entered into BUSY BIT TABLE 330. The ready bit of the entry, which uses the physical register as a source register, is entered in SCHEDULING WINDOW 371.

The arrow output from REGISTER MAPPING TABLE 310 input to ACTIVE LIST 320 indicates that the number of the physical register, which is used as destination register, is entered into ACTIVE LIST 320. The number of the physical register remains in ACTIVE LIST 320 until it graduates.

The arrow output from ACTIVE LIST 320 input into FREE LIST 300 indicates that the number of the physical register is entered into FREE LIST 300 after the physical register graduates.

The arrow output from FREE LIST 300 input to BUSY BIT TABLE 330 indicates that the number of the physical register, which is not active and is pooled for reuse, is entered into BUSY BIT TABLE 330. The busy bit of the entry, which uses the physical register as a destination register, is set. If the entry is executed speculatively, the speculative bit of the entry is also set.

In accordance with the present invention, therefore, each instruction is dismissed from the instruction scheduling mechanism just after being dispatched to the arithmetic logic unit so that it is avoided to lower the effective capacity of the instruction scheduling mechanism. As a result, the performance penalty of the processor can be avoided.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. An instruction scheduling system for decoding and executing an instruction by dynamically scheduling the instruction, said instruction scheduling system comprising:

an instruction cache;

a decoder configured to receive the instruction from the instruction cache and decode the instruction;

a scheduling mechanism configured to receive the instruction from the decoder, dispatch the instruction, and dismiss the instruction after being dispatched;

a reissuing mechanism configured to receive the instruction from the decoder, but not through the scheduling mechanism, reissue the instruction when a speculative execution fails, and dismiss the instruction after being committed; and a functional unit configured to receive the instruction dispatched from the scheduling mechanism and, when the speculative execution fails, to receive the reissued instruction, which is transferred from the reissuing mechanism, but not through the scheduling mechanism.

2. The instruction scheduling system of claim 1, wherein a number of instruction entries in the scheduling mechanism is smaller than that of the reissuing mechanism.

3. The instruction scheduling system of claim 2, wherein the reissuing mechanism is pipelined.

4. An instruction scheduling system for decoding and executing an instruction by dynamically scheduling the instruction, said instruction scheduling system comprising:

caching means for caching an instruction;

decoding means for receiving the instruction from the caching means and decoding the instruction;

scheduling means for receiving the instruction from the decoding means, dispatching the instruction, and dismissing the instruction after being dispatched;

reissuing means for receiving the instruction from the decoding means, but not through the scheduling means, reissuing the instruction when a speculative execution fails, and dismissing the instruction after being committed; and functional means for receiving the instruction dispatched from the scheduling means and, when a speculative execution fails, for receiving the reissued instruction, which is transferred from the reissuing means, but not through the scheduling means.

5. The instruction scheduling system of claim 4, wherein a number of instruction entries in the scheduling means is smaller than that of the reissuing means.

6. The instruction scheduling system of claim 5, wherein the reissuing means is pipelined.

* * * * *